United States Patent
Victor

(10) Patent No.: US 6,938,807 B2
(45) Date of Patent: Sep. 6, 2005

(54) COLLAPSIBLE TRUNK CARGO ORGANIZER

(76) Inventor: Robert J. Victor, 114 Beemer Church Rd., Sussex, NJ (US) 07461

( * ) Notice: Subject to any disclaimer, the term of this patent is extended or adjusted under 35 U.S.C. 154(b) by 305 days.

(21) Appl. No.: 10/424,628

(22) Filed: Apr. 28, 2003

(65) Prior Publication Data

US 2004/0211805 A1 Oct. 28, 2004

(51) Int. Cl.⁷ ................................................. B60R 9/00
(52) U.S. Cl. ....................... 224/497; 224/925; 224/539; 211/201; 211/12
(58) Field of Search ............................... 224/925, 497, 224/539; 211/195, 12, 201; 220/666

(56) References Cited

U.S. PATENT DOCUMENTS

| | | | |
|---|---|---|---|
| 784,035 A | * | 3/1905 | Connard ..................... 211/105 |
| 995,771 A | * | 6/1911 | Coyle .......................... 224/497 |
| 1,449,419 A | * | 3/1923 | Kraus ............................ 5/99.1 |
| 1,489,527 A | * | 4/1924 | Henry ............................. 220/6 |
| 4,029,244 A | * | 6/1977 | Roberts ................... 224/42.34 |
| 4,305,519 A | | 12/1981 | Gerich |
| 5,234,116 A | * | 8/1993 | Kristinsson et al. ........ 211/201 |
| 5,366,189 A | | 11/1994 | Thompson |
| 5,379,906 A | | 1/1995 | Levin et al. |
| 5,518,170 A | * | 5/1996 | Rasmussen ............ 229/120.26 |
| 5,526,972 A | | 6/1996 | Frazier et al. |

* cited by examiner

Primary Examiner—Tri M. Mai
(74) Attorney, Agent, or Firm—Sturm & Fix LLP

(57) ABSTRACT

A collapsible cargo organizer construction (10) for supporting, segregating, and removing packages (100) from the rear storage area (200) of a vehicle wherein the organizer construction (10) includes a collapsible framework member (20) including a plurality of upper (22) and lower (23) support arms that are pivotally associated with a lesser plurality of vertical support legs (21) to define a pair of generally open cube shaped framework segments (20A) and (20B) wherein, at least three of the sides of each framework segment (20A) and (20B) are covered by an elongated fabric sheet (30) and each framework segment (20A) (20B) is provided with a detachable floor support unit (13).

16 Claims, 2 Drawing Sheets

COLLAPSIBLE TRUNK CARGO ORGANIZER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of trunk cargo organizers in general and in particular to a dual compartment trunk organizer that utilizes the interior walls of a vehicle trunk to effectively create four individual cargo compartments.

2. Description of Related Art

As can be seen by reference to the following U.S. Pat. Nos. 4,305,519; 5,526,972; 5,379,906; and 5,366,189, the prior art is replete with myriad and diverse vehicle trunk cargo dividers or organizers.

While all of the aforementioned prior art constructions are more than adequate for the basic purpose and function for which they have been specifically designed, they are uniformly deficient with respect to their failure to provide a simple, efficient, and practical trunk cargo organizer that is collapsible yet is provided with detachable floor panels that allow the organizer to lift the contents of a pair of segregated compartments with the cargo organizer in its fully extended disposition.

While most of the prior art constructions are adept at separating and supporting bags of groceries during transport, they have no provisions for simultaneously lifting the organizer and at least some of the segregated grocery bags from the vehicle at the end of a shopping trip.

As a consequence of the foregoing situation, there has existed a longstanding need among vehicle owners for a new and improved collapsible cargo organizer that will not only divide a vehicle trunk into four separate storage zones, but will also physically and simultaneously remove two segregated groups of packages from the trunk with the removal of the organizer, and the provision of such a construction is a stated objective of the present invention.

BRIEF SUMMARY OF THE INVENTION

Briefly stated, the collapsible cargo organizer construction that forms the basis of the present invention comprises in general a collapsible framework unit, a fabric retainer unit and a pair of detachable floor support units.

As will be explained in greater detail further on in the specification, the framework unit comprises a collapsible framework member fabricated from a first plurality of upper and lower support arms pivotally associated with a second plurality of vertical support legs so as to form two generally open cube shaped framework segments.

In addition, the fabric retainer unit includes an elongated sheet of fabric that is operatively associated with the vertical support legs to cover at least three sides of each framework segment wherein, each framework segment is further provided with a detachable floor support unit.

The floor support unit in turn includes two strap members having a first end connected to opposed lower support arms, and a second end provided with cooperating fastener components.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
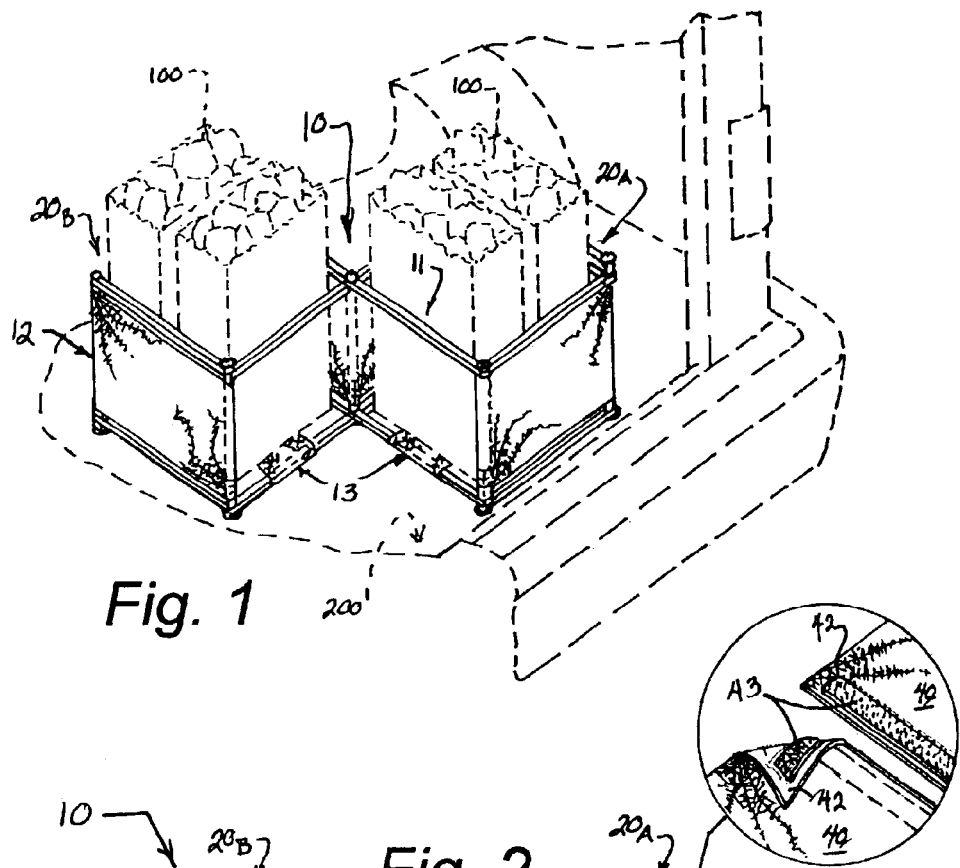
FIG. 1 is a perspective view of the organizer operatively disposed in the trunk area of a vehicle.
Figure 2:
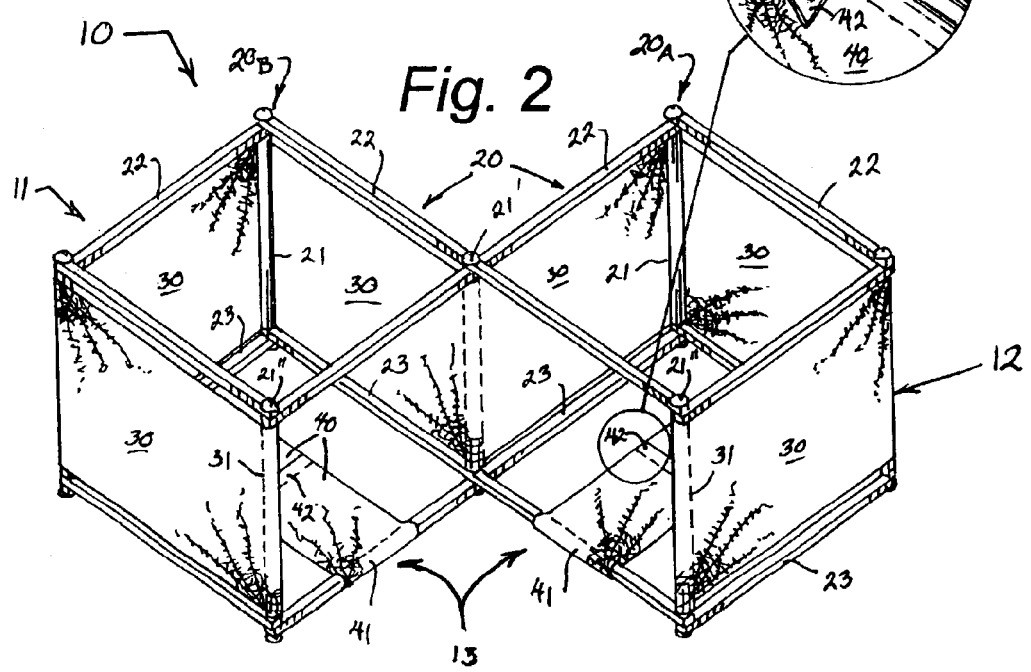
FIG. 2 is an isolated perspective view of the organizer in its fully extended mode.

As can be seen by reference to the drawings, and in particularly to FIGS. 1 and 2, the cargo organizer construction that forms the basis of the present invention is designated generally by the reference number 10. The organizer construction 10 comprises in general a collapsible framework unit 11, a fabric retainer unit 12, and a pair of detachable floor support units 13. These units will now be described in seriatim fashion.

Figure 3:
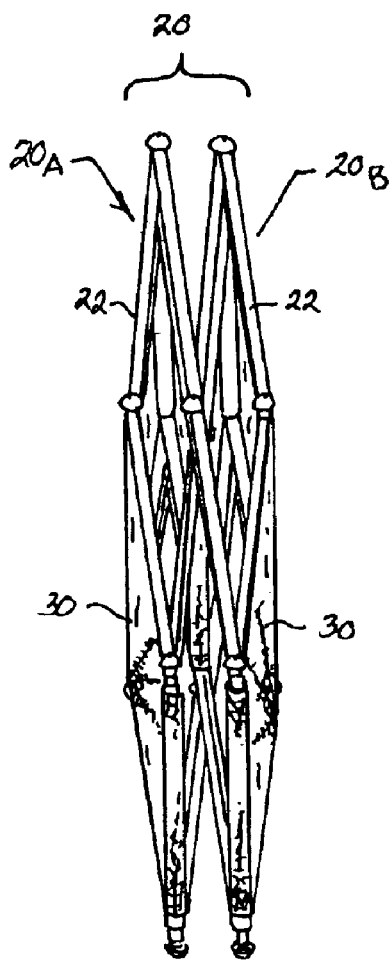
FIG. 3 is a top plan view of the organizer in its collapsed mode.

As can be shown in FIGS. 2 and 3, the framework unit 11 comprises a collapsible framework member 20 including a plurality of vertical support legs 21 operatively connected between a plurality of upper 22 and lower 23 horizontal support arms pivotally associated with one another and with the vertical support legs 21 wherein, a central vertical support leg 21' forms a common pivotal connection between two generally cube shaped collapsible framework segments.

In the preferred embodiment of the invention depicted in FIG. 2, both the vertical support legs 21 and the upper 22 and lower 23 support arms have the same general dimensions and include seven vertical support legs 21 and eight upper 22 and lower 23 support arms wherein, each vertical support leg 21 is pivotally connected to to at least a pair of upper 22 and lower 23 support arms with the notable exception of the central vertical support leg 21' the upper end of which is pivotally connected to two pairs of upper 22 and lower 23 related support arms as will be explained in greater detail further on in the specification.

Figure 4:
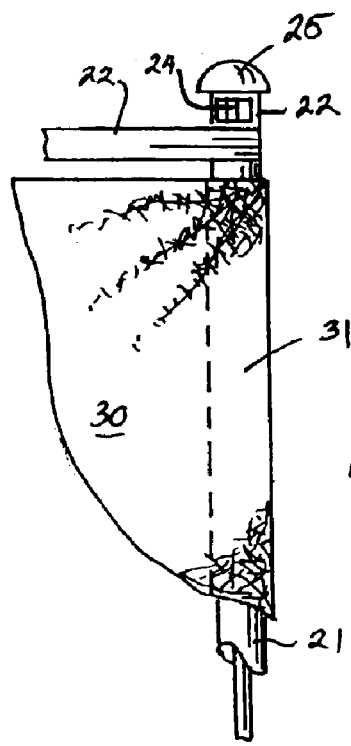
FIG. 4 is an isolated detail view of a portion of the framework unit and the fabric retainer unit; and, FIG. 5 is an isolated detail view of the gripper points provided on the bottom of the framework unit.
Figure 5:
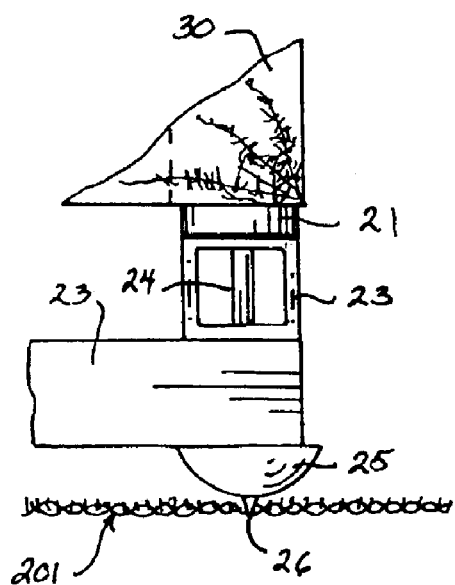

Turning now to FIGS. 4 and 5, it can be seen that each of the vertical support legs 21 is hollow and provided with an elongated pivot rod element 24 the opposite ends of which extend beyond the opposed ends of each vertical support leg 21 passing through related pairs of both upper 22 22 and lower 23 23 support arms, and are further provided with end cap elements 25 wherein, each of the lower end cap elements 25 is further provided with a centrally disposed prong 26 that will penetrate the carpet lining 201 of most vehicle trunk areas to maintain the framework member 20 in its fully deployed position depicted in FIGS. 1 and 2.

Furthermore, as can best be seen by reference to FIGS. 2 and 4, the fabric retainer unit 12 comprises an elongated sheet of fabric 30 the opposite ends 31 of which are fixedly secured to selected vertical support legs 21" on each framework segment 20A 20B wherein the sheet of fabric 30 passes on the outside of each vertical support leg 21 on each framework segment 20A 20B and passes on the inside of the central common vertical support leg 21' that connects each framework segment.

As can also be seen by reference to FIGS. 1 and 2, the sheet of fabric 30 only covers three of the vertical sides of each framework segment 20A 20B wherein, the open sides of the framework segments 20A 20B are generally opposed to one another.

Turning now to FIG. 2, it can be seen that each of the pairs of floor support units 13 comprises a pair of relatively wide strap members 40 having one end 41 fixedly secured to one of an opposed pair of lower support arms 23 23 wherein, the other end 42 of the pairs of strap members 40 are provided with cooperating hook and loop fastening components 43.

The reason that each pair of strap members 40 is detachably associated with one another is to allow the collapsible framework member 20 to be folded into its collapsed mode of disposition which would be rendered impossible if the pairs of strap members 40 could not be separated during the framework folding process. Furthermore, while the sheet of fabric 30 provides lateral support for packages 100 in each framework segment 20A and 20B, the strap members 40 support the bottom of the packages 100 when the organizer construction 10 is lifted in its deployed disposition from the truck area 200 of a vehicle.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A collapsible cargo organizer construction for supporting, segregating, and removing packages from the rear storage area of a vehicle wherein, the organizer construction comprises a framework unit including a collapsible framework member having two mirror image framework segments wherein, each framework segment is deployable into a generally open cube shaped configuration a pair of floor support units wherein, each floor support unit includes a pair of generally wide strap members operatively associated with one of the framework segments wherein, each strap member has a first end fixedly secured to opposed portions of each framework segment and a second end provided with one portion of a pair of cooperating fasteners.

2. The organizer construction as in claim 1; wherein, said collapsible framework member comprises a first plurality each of upper and lower horizontal support arms and a second plurality of vertical support legs pivotally connected to said upper and lower horizontal support arms.

3. The organizer construction as in claim 2; wherein, said first plurality is greater in number than said second plurality.

4. The organizer construction as in claim 1 further comprising a fabric retainer unit including an elongated sheet of fabric at least partially surrounding each of said framework segments.

5. The organizer construction as in claim 4; wherein, said sheet of fabric surrounds at least three sides of the each cube shaped framework segments.

6. The organizer construction as in claim 3; wherein, the framework member includes eight lower horizontal support arms, eight upper horizontal support arms and seven vertical support legs.

7. The organizer as in claim 6; wherein, each of the vertical support legs is pivotally connected to at least a pair of upper and lower support arms.

8. The organizer as in claim 7; wherein, one of the vertical support legs is pivotally connected to two pairs each of upper and lower support arms.

9. The organizer as in claim 8 further comprising a fabric retainer unit including an elongated sheet of fabric at least partially surrounding each of said framework segments.

10. The organizer as in claim 9; wherein, said sheet of fabric surrounds at least three sides of the each cube shaped framework segments.

11. The organizer construction as in claim 6; wherein, each of the vertical support legs has an upper and lower end provided with cap elements, and wherein, at least the cap elements on the lower ends of the vertical support legs are provided with means for frictionally engaging the floor of the rear storage area of a vehicle.

12. The organizer as in claim 10; wherein, each of the vertical support legs has an upper and lower end provided with cap elements, and wherein, at least the cap elements on the lower ends of the vertical support legs are provided with means for frictionally engaging the floor of the rear storage area of a vehicle.

13. The organizer as in claim 6; further comprising a fabric retainer unit including an elongated sheet of fabric at least partially surrounding each of said framework segments.

14. The organizer as in claim 13; wherein, the elongated sheet of fabric is operatively engaged with all seven of the vertical support legs of the framework member.

15. The organizer as in claim 14; wherein, said sheet of fabric surrounds at least three sides of the each cube shaped framework segments.

16. The organizer as in claim 14; wherein, the elongated sheet of fabric only surrounds three sides of each cube shaped framework segment.

* * * * *